(12) United States Patent
Ozaki et al.

(10) Patent No.: US 7,170,455 B2
(45) Date of Patent: Jan. 30, 2007

(54) ATTACHMENT STRUCTURE FOR ANTENNA AND ELECTRONIC APPARATUS

(75) Inventors: Nozomi Ozaki, Kanagawa (JP);
Katsuyoshi Onishi, Kanagawa (JP);
Hiroki Tamai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/101,571

(22) Filed: Apr. 8, 2005

(65) Prior Publication Data

US 2005/0237262 A1    Oct. 27, 2005

(30) Foreign Application Priority Data

Apr. 23, 2004    (JP) .............................. 2004-128376

(51) Int. Cl.
*H01Q 1/24* (2006.01)

(52) U.S. Cl. .................................... 343/702

(58) Field of Classification Search ................ 343/702, 343/700 MS, 841, 846
See application file for complete search history.

(56) References Cited

U.S. PATENT DOCUMENTS 5,874,920 A * 2/1999 Araki et al. ................ 343/702
6,556,812 B1 * 4/2003 Pennanen et al. ........... 343/702
6,753,818 B2 * 6/2004 Wang ......................... 343/702
2005/0079903 A1 * 4/2005 Taketomi et al. ........ 455/575.5

* cited by examiner

*Primary Examiner*—Trinh Dinh
*Assistant Examiner*—Huedung Mancuso
(74) *Attorney, Agent, or Firm*—Oblon, Spivak, McClelland, Maier & Neustadt, P.C.

(57) ABSTRACT

An attachment structure for an antenna which assures a good performance of the antenna and an electronic apparatus which can be miniaturized while assuring a good performance of an antenna are disclosed. The includes a display block capable of displaying various display screens thereon, and an attachment base made of a metal and having the display block attached thereto. The attachment base is positioned at least on the rear face side of the display block. The electronic apparatus further includes an antenna for performing radio communication therethrough. Each of the attachment base and the antenna has a positioning element provided thereon such that the positioning element of the antenna is positioned on and with respect to the positioning element of the attachment base to attach the antenna to the attachment base positioned on the rear face side of the display block.

6 Claims, 4 Drawing Sheets

ATTACHMENT STRUCTURE FOR ANTENNA AND ELECTRONIC APPARATUS

BACKGROUND OF THE INVENTION

This invention relates to an attachment structure for an antenna and an electronic apparatus.

Electronic apparatus such as, for example, information processing apparatus represented by personal computers of the type which are ready not only for wire communication but also for radio communication have been popularized in recent years.

For example, some of information processing apparatus such as personal computers have built therein a radio communication module for executing signal modulation/demodulation processes to allow radio communication and an antenna which functions as a radio communication interface. Radio communication of data is performed in such a manner that transmission data read out from a memory or the like are modulated suitably by the radio communication module and transmitted as radio waves from the antenna. On the other hand, radio reception of data is performed in such a manner that radio waves are received by the antenna and the reception data are demodulated suitably by the radio communication module and stored into the memory or the like.

The antenna which functions as a radio communication interface as described above is electrically connected to the radio communication module, for example, by a coaxial cable. A transmission/reception portion for transmitting and receiving radio waves is provided at an end portion of the coaxial cable.

In a conventional electronic apparatus, a recess is formed on an inner face of a case serving as a housing of the apparatus such as, for example, a case on which a display block (liquid crystal panel) is disposed, and the antenna is attached to the recess such that it is built in the case. The built-in antenna is disposed on the rear face side of the display block. One of such electronic apparatus as just described is disclosed, for example, in Japanese Patent Laid-Open No. 2003-258520 (hereinafter referred to as Patent Document 1).

Incidentally, an antenna which functions as a radio communication interface is likely to receive a bad influence from a metal element positioned therearound, and there is the possibility that the frequency characteristic thereof may be varied. Accordingly, as regards the location of the antenna, it is necessary to exclude any metal member from within a fixed range centered at a transmission/reception portion of the antenna.

However, a display unit is usually attached to an attachment base made of a metal, and the display unit is disposed on the case such that the attachment base is secured to the case, which serves as a housing, by means of screws or the like. The attachment base is usually positioned in such a manner as to cover over the rear face and the side faces of the display unit.

Accordingly, where the antenna is attached to the inner face of the case serving as a housing and is disposed on the rear face side of the display unit as in the case of the conventional electronic apparatus, there is the possibility that two errors including an error in attachment of the antenna to the case and another error in attachment of the attachment base to the case may displace the distance between the antenna and the attachment base made of a metal from a designed distance between them, resulting in deterioration of the performance of the antenna.

If the distance between the antenna and the attachment base is designed with a sufficient margin taking the displacement of the distance by the two errors in attachment described above into consideration, then the thickness of the case increases as much. This obstructs miniaturization of the electronic apparatus.

SUMMARY OF THE INVENTION

It is an object of the present invention to provide an attachment structure for an antenna which assures a good performance of the antenna.

It is another object of the present invention to provide an electronic apparatus which can be miniaturized while assuring a good performance of an antenna.

In order to attain the objects described above, according to the present invention, an antenna is attached to an attachment base made of a metal on which a display block is held to assure a good performance of the antenna.

In particular, according to an aspect of the present invention, there is provided an attachment structure for an antenna, including a display block capable of displaying various display screens thereon, an attachment base made of a metal and having the display block attached thereto, the attachment base being positioned at least on the rear face side of the display block, and an antenna for performing radio communication therethrough, each of the attachment base and the antenna having a positioning element provided thereon, the positioning element of the antenna being positioned on and with respect to the positioning element of the attachment base to attach the antenna to the attachment base positioned on the rear face side of the display block.

In the attachment structure for an antenna, the antenna is positioned with respect to the attachment base made of a metal such that a fixed distance is assured between a portion of the antenna which may receive a bad influence of a metal member and the attachment base which is a metal member. Consequently, a good performance of the antenna can be assured.

Further, since there is no necessity to take two errors including an error in attachment of the antenna to the housing and another error in attachment of the attachment base to the housing into consideration, the positional relationship between the antenna and the attachment base made of a metal is not likely to be displaced from a designed positional relationship between them. Consequently, reduction in size and thickness of an electronic apparatus in which the antenna is provided can be anticipated as much.

A positioning projection or a positioning hole may be formed as the positioning element of the attachment base while a positioning hole or a positioning projection is formed as the positioning element of the antenna. With the attachment structure for an antenna, positioning of the antenna with respect to the attachment base made of a metal can be performed readily by positioning the positioning projection and the positioning hole relative to each other.

Preferably, an antenna in the form of a film is used as the antenna. With the attachment structure for an antenna, the arrangement space for the antenna may be small, and consequently, reduction in size and thickness of an electronic apparatus in which the antenna is provided can be anticipated.

According to another aspect of the present invention, there is provided an electronic apparatus, including a housing, a display block disposed on the housing and capable of displaying various display screens thereon, an attachment base made of a metal and having the display block attached thereto, the attachment base being positioned at least on the rear face side of the display block, and an antenna for performing radio communication therethrough, each of the attachment base and the antenna having a positioning element provided thereon, the positioning element of the antenna being positioned on and with respect to the positioning element of the attachment base to attach the antenna to the attachment base positioned on the rear face side of the display block.

In the electronic apparatus, the antenna is positioned with respect to the attachment base made of a metal such that a fixed distance is assured between a portion of the antenna which may receive a bad influence of a metal member and the attachment base which is a metal member. Consequently, a good performance of the antenna can be assured.

Further, since there is no necessity to take two errors including an error in attachment of the antenna to the housing and another error in attachment of the attachment base to the housing into consideration, the positional relationship between the antenna and the attachment base made of a metal is not likely to be displaced from a designed positional relationship between them. Consequently, reduction in size and thickness of the electronic apparatus can be anticipated as much.

A positioning projection or a positioning hole may be formed as the positioning element of the attachment base while a positioning hole or a positioning projection is formed as the positioning element of the antenna. With the electronic apparatus, positioning of the antenna with respect to the attachment base made of a metal can be performed readily by positioning the positioning projection and the positioning hole relative to each other.

Preferably, an antenna in the form of a film is used as the antenna. With the positioning apparatus, the arrangement space for the antenna may be small, and consequently, reduction in size and thickness of the electronic apparatus can be anticipated.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, an attachment structure for an antenna and an electronic apparatus according to a preferred embodiment of the present invention are described with reference to the accompanying drawings.

The electronic apparatus according to the present invention can be applied widely to electronic apparatus such as personal computers, and electronic apparatus which include an antenna such as various information processing apparatus such as PDAs (Personal Digital Assistants), network terminals, portable information terminals and work stations, and acoustic apparatus. The attachment structure for an antenna according to the present invention can be applied widely to attachment structures for an antenna provided for such various electronic apparatus as mentioned above.

In the embodiment described below, the electronic apparatus according to the present invention is applied to a personal computer which is a kind of information processing apparatus, and the attachment structure for an antenna according to the present invention is applied to an attachment structure for an antenna provided in the personal computer.

Figure 1:
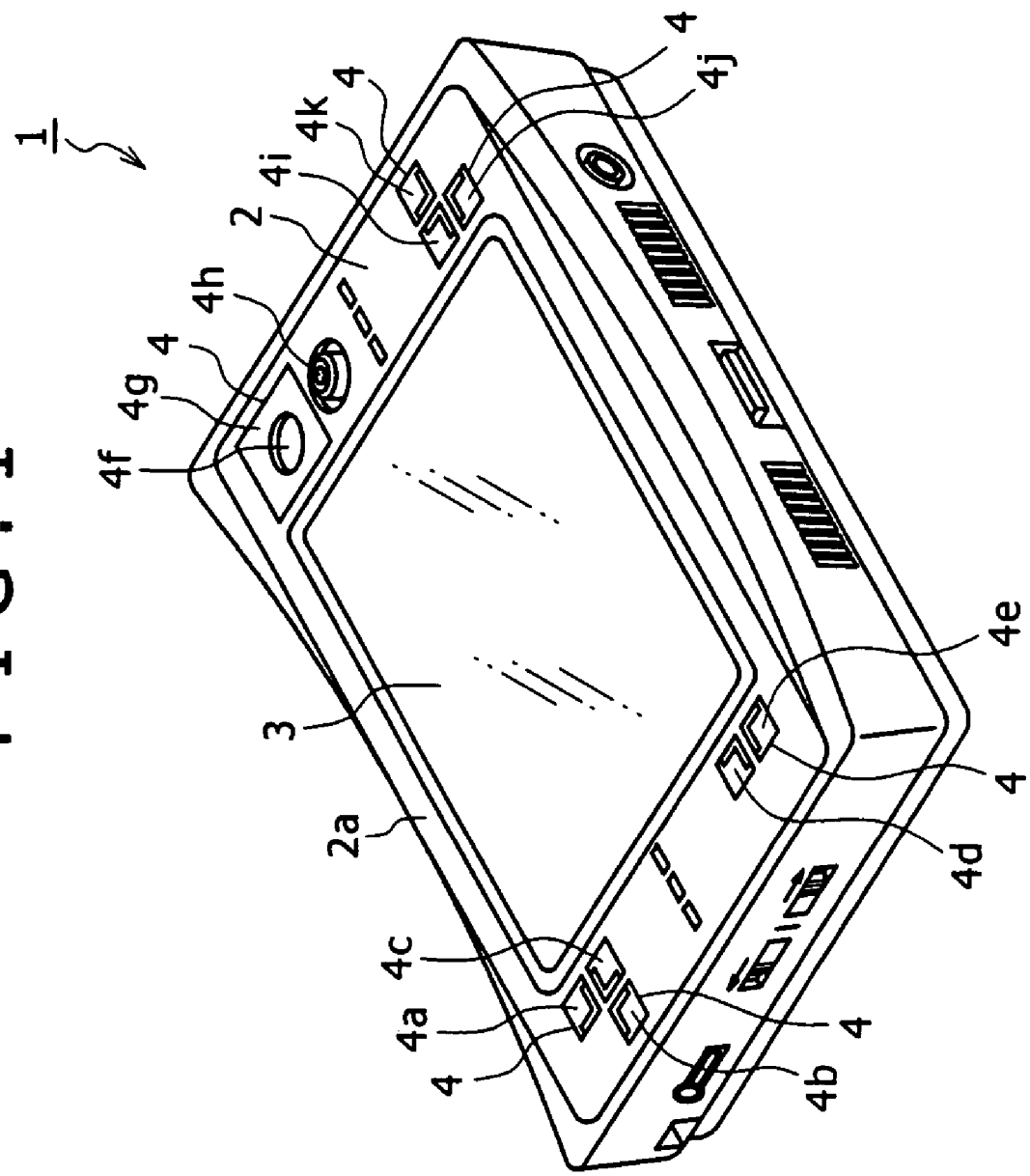
FIG. 1 is a perspective view of an electronic apparatus to which the present invention is applied.

Referring first to FIG. 1, the electronic apparatus 1 in the form of a personal computer includes a housing 2 in and on which various components are disposed. The housing 2 is formed generally in an elongated flattened rectangle, and a display block 3 which may be a liquid crystal panel is disposed on a front face 2a of the housing 2.

The display block 3 of the electronic apparatus 1 is formed as a touch panel or tablet, and various operations such as a selection operation and an inputting operation can be performed by touching or tapping a predetermined position of a display screen displayed on the display block 3 using a finger or an input pen or stylus for exclusive use not shown.

A plurality of operation buttons 4 are provided at predetermined positions of the housing 2. The operation buttons 4 typically include a center button 4a, a left button 4b, a right button 4c, a zoom button 4d, a rotation button 4e, an enter button 4f, a cursor key 4g, a pointing device 4h, a function selection button 4i, a start button 4j and a luminance changing button 4k.

The center button 4a, left button 4b and right button 4c correspond to buttons provided on a mouse, and the zoom button 4d is used to expand or contract a display screen to be displayed on the display block 3. The rotation button 4e is used to rotate the display screen by 90°, and the enter button 4f corresponds to an enter key of a keyboard and used to execute or settle an operation. The cursor key 4g is used to move a cursor displayed on the display block 3 in various directions such as upward, downward, leftward and rightward directions. The pointing device 4h is used to move a pointer displayed on the display block 3, and the function selection button 4i is used to change the volume of sound to be outputted or to change over the output to an external display unit. The start button 4j is used to start particular software, and the luminance changing button 4k is used to change the luminance of the display block 3.

Figure 2:
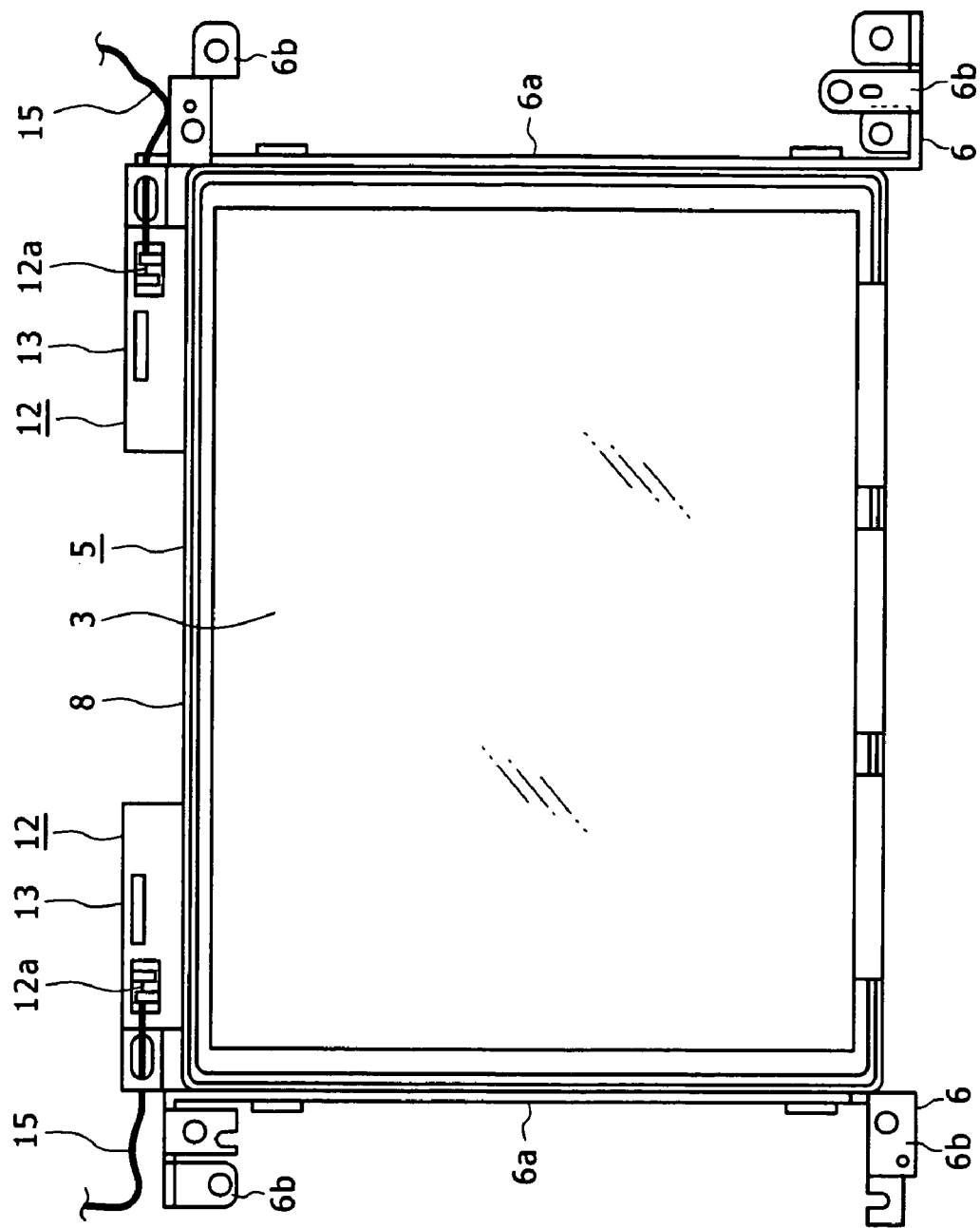
FIG. 2 is a plan view of the electronic apparatus showing a display block held by an attachment base together with brackets.
Figure 3:
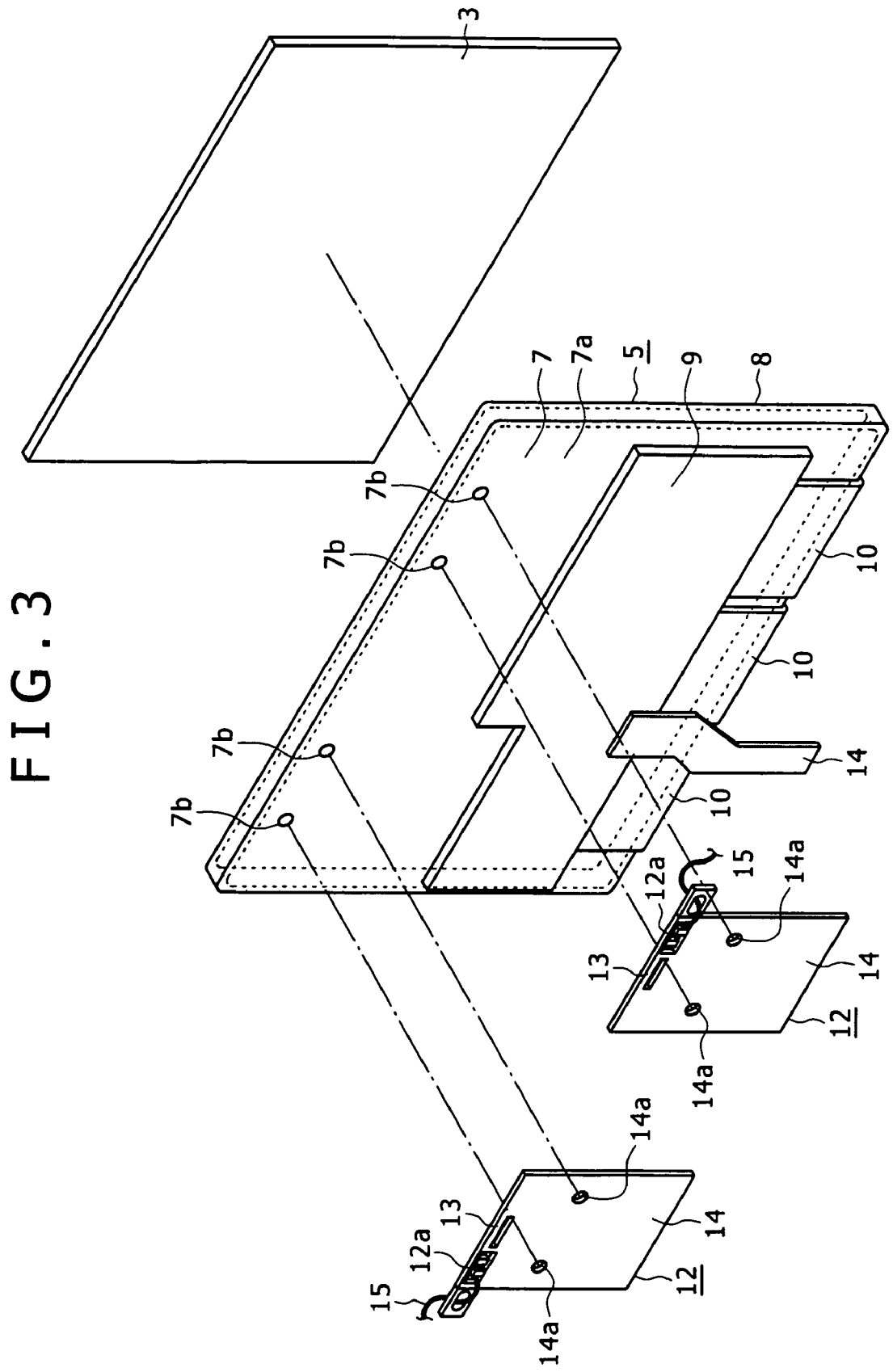
FIG. 3 is an exploded perspective view showing the display block, the attachment base and an antenna of the electronic apparatus.

Referring to FIGS. 2 and 3, the display block 3 is attached to an attachment base 5 made of a metal, and the attachment base 5 is attached to the housing 2 through a pair of brackets 6. The attachment base 5 includes a base portion 7 positioned on the rear face side of the display block 3 and peripheral edge portions 8 provided on outer peripheral edges of and formed integrally with the base portion 7 by being bent by 90° with respect to the base portion 7. The display block 3 is attached to the attachment base 5 in such a state that it is fitted in a shallow recess defined by the base portion 7 and the peripheral edge portions 8.

Two pairs of positioning projections 7b are provided in a leftwardly and rightwardly spaced relationship from each other at positions of the base portion 7 rather near to an upper end of a rear face 7a as seen in FIG. 3. The positioning projections 7b serve as positioning elements for positioning an antenna hereinafter described.

Each of the brackets 6 is integrally made of a metal material and includes a base portion 6a elongated in one direction and a pair of attached portions 6b projecting laterally from the base portion 6a and formed integrally with the base portion 6a as seen in FIG. 2. Each of the brackets 6 is attached at the base portion 6a thereof to one of the peripheral edge portions 8 positioned on the left and right of the base portion 7 by means of a screw or the like and is attached at the attached portions 6b thereof to a predetermined position of the housing 2 by means of screws or the like.

Figure 4:
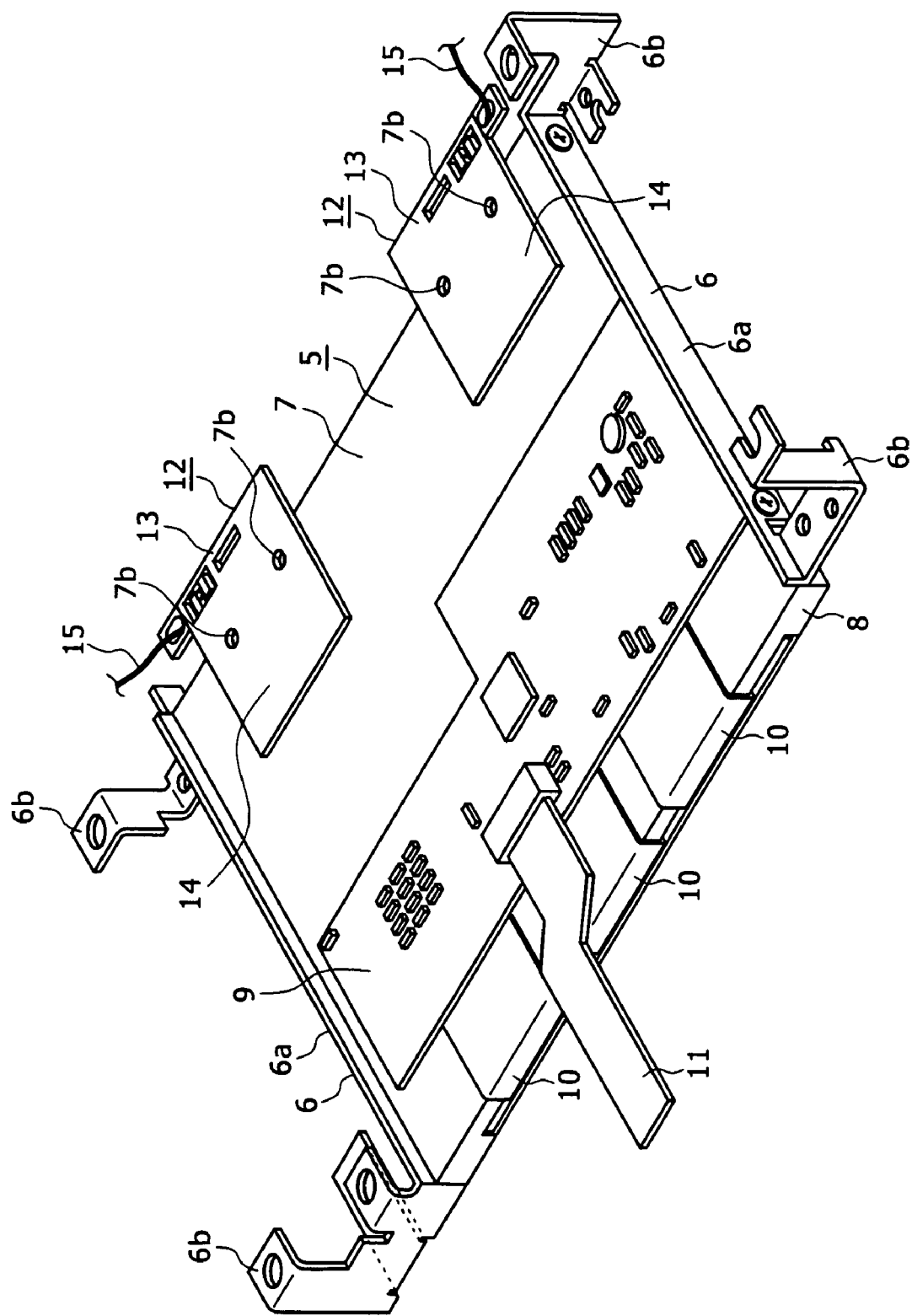
FIG. 4 is a perspective view showing the brackets, attachment base and antenna of the electronic apparatus.

A drive circuit board 9 is attached at a rather downwardly displaced position on the rear face 7a of the base portion 7 of the attachment base 5 as seen in FIGS. 3 and 4. The drive circuit board 9 is provided for driving the display block 3, and required electronic parts are mounted on the drive circuit board 9.

The drive circuit board 9 is connected to the display block 3 by three wiring boards 10 in the form of a film. The wiring boards 10 are folded back in the proximity of the lower side of the base portion 7 and connected to the display block 3. The drive circuit board 9 is connected to a mother board not shown disposed in the inside of the housing 2 by a flexible printed circuit board 11. A CPU (Central Processing Unit) for performing operation control of the entire electronic apparatus 1, processing of data and so forth, a radio communication module for performing a modulation process of transmission data and a demodulation process of reception data to perform radio communication and other necessary circuit elements are carried on the mother board.

A pair of antennae 12 in the form of a film are attached in a leftwardly and rightwardly spaced relationship from each other at rather upper positions of the rear face 7a of the base portion 7 of the attachment base 5.

Each of the antennae 12 has an upper end portion formed as a radio emitting element 13 and has the other portion formed as a ground portion 14. The ground portion 14 has two positioning holes 14a formed in a leftwardly and rightwardly spaced relationship from each other therein. The positioning holes 14a serve as positioning elements for positioning the antenna 12 with respect to the attachment base 5.

Each of the antennae 12 is connected to the radio communication module carried on the mother board by a coaxial cable 15. Each of the coaxial cables 15 is connected at an end portion thereof to the radio emitting element 13 of the corresponding antenna 12 such that the end portion forms a transmission/reception portion 12a for transmitting and receiving radio waves.

The antennae 12 are disposed such that the transmission/reception portions 12a thereof are spaced by a fixed distance, for example, by at least 5 mm from the attachment base 5 and the brackets 6 which are metal members so that they do not receive an influence of the metal members.

Each of the antennae 12 is attached such that a pair of ones of the positioning projections 7b provided on the base portion 7 are inserted in the positioning holes 14a of the antenna 12 and the ground portion 14 of the antenna 12 is attached to the rear face 7a of the base portion 7, for example, by means of a double-sided adhesive tape not shown as seen in FIGS. 3 and 4. Accordingly, the transmission/reception portion 12a and the radio emitting element 13 of each of the antennae 12 project upwardly from the base portion 7.

Where the positioning projections 7b provided on the attachment base 5 and the positioning holes 14a formed in the antennae 12 as described above are positioned relative to each other, the antennae 12 can be positioned readily with respect to the attachment base 5 made of a metal.

In the configuration described above, the positioning projections 7b are provided as positioning elements on the attachment base 5 while the positioning holes 14a are formed as positioning elements in the antennae 12. However, also it is possible to conversely form positioning holes as positioning elements in the attachment base 5 and provide positioning projections as positioning elements on the antennae 12 so that the antennae 12 are positioned with respect to the attachment base 5.

In the electronic apparatus 1 having such a configuration as described above, radio communication of data is performed such that transmission data read out from a memory not shown or the like are modulated by the radio module and transmitted as radio waves from the antennae 12. On the other hand, radio reception of data is performed such that radio waves are received by the antennae 12 to receive data and the reception data are demodulated suitably by the radio module and stored into the memory or the like.

While radio transmission and reception of data are performed in such a manner as described above, the electronic apparatus 1 includes two antennae 12 and adopts a diversity system. Thus, upon transmission of data, that one of the antennae 12 which serves as a main antenna is used, but upon reception of data, one of the antennae 12 which exhibits a higher reception power level is used.

As described above, in the electronic apparatus 1, the positioning projections 7b are provided on the attachment base 5 made of a metal while the positioning holes 14a are formed in the antennae 12, and the positioning projections 7b and the positioning holes 14a are positioned relative to each other to attach the antennae 12 to the attachment base 5. Therefore, a fixed distance is secured between the transmission/reception portions 12a and the attachment base 5 in the form of a metal member, and consequently, a good performance of the antennae 12 can be assured.

Further, different from the conventional electronic apparatus, the electronic apparatus 1 does not necessitate to take the two errors including an error in attachment of the antenna to the housing and another error in attachment of the attachment base to the housing into consideration. Therefore, the positional relationship between the antennae 12 and the attachment base 5 made of a metal is not likely to be displaced from a designed positional relationship between them, and reduction in size and thickness of the electronic apparatus 1 can be anticipated as much.

Further, where an antenna of such a type of a film as described above is used for the antennae 12, the space for disposition of the antennae 12 can be reduced, and further reduction in size and thickness of the electronic apparatus 1 can be anticipated.

Further, while an antenna in the form of a film is used for the antennae 12, the configuration of the antennae 12 is not limited to the specific configuration.

While a preferred embodiment of the present invention has been described using specific terms, such description is for illustrative purpose only, and it is to be understood that changes and variations may be made without departing from the spirit or scope of the following claims.

What is claimed is:

1. An attachment structure for an antenna, comprising:
    a display block capable of displaying various display screens thereon;

an attachment base made of a metal and having said display block attached thereto, said attachment base being positioned at least on the rear face side of said display block; and an antenna for performing radio communication therethrough;

each of said attachment base and said antenna having a positioning element provided thereon;

said positioning element of said antenna being positioned on and with respect to said positioning element of said attachment base to attach said antenna to said attachment base positioned on the rear face side of said display block.

2. The attachment structure for an antenna according to claim 1, wherein a positioning projection or a positioning hole is formed as said positioning element of said attachment base while a positioning hole or a positioning projection is formed as said positioning element of said antenna.

3. The attachment structure for an antenna according to claim 1, wherein an antenna in the form of a film is used as said antenna.

4. An electronic apparatus, comprising:
a housing;
a display block disposed on said housing and capable of displaying various display screens thereon;
an attachment base made of a metal and having said display block attached thereto, said attachment base being positioned at least on the rear face side of said display block; and an antenna for performing radio communication therethrough;

each of said attachment base and said antenna having a positioning element provided thereon;

said positioning element of said antenna being positioned on and with respect to said positioning element of said attachment base to attach said antenna to said attachment base positioned on the rear face side of said display block.

5. The electronic apparatus according to claim 4, wherein a positioning projection or a positioning hole is formed as said positioning element of said attachment base while a positioning hole or a positioning projection is formed as said positioning element of said antenna.

6. The electronic apparatus according to claim 4, wherein an antenna in the form of a film is used as said antenna.

* * * * *